Patented Apr. 6, 1943

2,315,771

UNITED STATES PATENT OFFICE 2,315,771

TREATMENT OF RESIN OILS OF THE COUMARONE-INDENE-STYRENE HOMOLOGUE TYPE

Edwin Louis Cline, Philadelphia, Pa., assignor, by mesne assignments, to Allied Chemical & Dye Corporation, a corporation of New York No Drawing. Application November 20, 1939, Serial No. 305,336

8 Claims. (Cl. 260—669)

This invention relates to a process for the production of resins.

Resins of the coumarone type are prepared by polymerizing coumarone, indene and similar polymerizable substances in those fractions of coal tar distillate or other oil containing a substantial proportion of such polymerizable constituents. It has been found heretofore that in the production of these resins certain constituents of the oil form colored products which give the resin an undesirable dark color. It has also been found these undesirable constituents of the oil cause difficulties in operation such as excessive emulsification when the oil is subjected to contact with aqueous liquids, as in neutralization and washing operations.

To remove these color-forming bodies it has been proposed to subject the oil to various preliminary treatments such as washing with alkali, chlorination, and other treatments. These methods have proved costly, time-consuming, and are not particularly effective to accomplish the desired results.

It is an object of this invention to provide a process for treating oils containing polymerizable constituents of the coumarone type, in which process the color-forming bodies responsible for process difficulties and dark colored products are effectively removed from the oils.

I have discovered that a light colored resin may be prepared with a minimum of process difficulties when the resin oil which contains the polymerizable constituents is subjected to two preliminary distillations before polymerization; the first, a fractionation to remove, as distillate, low-boiling color-forming bodies, i. e. color-forming bodies having boiling points substantially below the boiling points of the desired polymerizable constituents, and the second, a low temperature distillation (i. e. a vacuum fractionation or steam distillation or both, preferably a vacuum fractionation) to separate, as residue, high-boiling color-forming constituents that decompose in the normal boiling range of the desired polymerizable constituents of the oil. (By "normal boiling range" is meant the boiling range at atmospheric pressure.) In preferred operation the first fractionation is continued up to a distillation temperature of about 150° C. at atmospheric pressure; in the second distillation the still temperature is maintained below about 190° C., and the distillation is conducted under reduced pressure so as to distill over that portion of the liquid which would pass over at temperatures up to about 205° C. at atmospheric pressure.

The process of this invention is applicable in general to oils used for production of resins of the coumarone type to remove from said oils those bodies which tend to make the resin dark-colored and cause difficulties in operation. I have found this process is particularly advantageous for treating "crude heavy solvent," a coumarone-indene fraction of coke oven origin containing polymerizable constituents of the coumarone-indene type and having a boiling range of from 135° to 205° C., and also "drip oil crude hiflash," a fraction of drip oil (i. e. the oil condensed in the mains through which coal distillation gas or water gas is passed) having a boiling range of from 135° to 205° C. and containing styrene, methyl styrene and other styrene homologues as well as indene. Other oils of similar composition such as those obtained in the cracking and reforming of petroleum oils may be treated in accordance with this invention.

As examples of color-forming bodies which may be removed from resin oils by the process of my invention there may be mentioned cyclopentadiene and dicyclopentadiene. It is generally the dimeric form of this compound, dicyclopentadiene (boiling point about 170° C.), that is present in an unrefined resin oil. As the oil is heated the dicyclopentadiene dissociates to give the monomeric form which boils at about 41° C. It might be expected therefore that fractionation alone would be effective to remove the cyclopentadiene and dicyclopentadiene, since the heating of the oil in the still would cause the dimer to dissociate to the monomer which would then, because of its low-boiling point, be removed during fractionation. However, I have found a side reaction takes place during such fractionation in which cyclopentadiene reacts with other unsaturated compounds in the oil to form addition compounds, which are stable up to about 190° C. and have boiling points around 220° C. Accordingly, only a part of the cyclopentadiene is removed by fractionation at atmospheric pressure, the remainder of the cyclopentadiene reacting to form high-boiling addition compounds. I have found, further, these high-boiling addition compounds are as undesirable as cyclopentadiene, in that they make the resin recovery operations difficult and result in formation of dark colored resins. If it were attempted to continue the fractionation at atmospheric pressure to distill over as a refined resin oil the desired polymerizable fraction of the resin oil, leaving the high-boiling addition compounds as still residue, the temperatures reached in this fractionation would be such that the addition compounds would decompose and reform cyclopentadiene, which would then pass over into the fraction intended for polymerization.

The process of my invention, involving a preliminary fractionation to remove color-forming bodies with boiling points below the boiling range of the essentially coumarone-indene fraction of the resin oil and a second fractionation under sufficient vacuum so that the still temperature is not substantially above 190° C. to produce a distillate equivalent to that which would pass over up to about 205° C. at atmospheric pressure, I have found, is effective to remove color-forming bodies such as cyclopentadiene, its polymers and its addition products.

In a preferred process carried out in accordance with my invention, a crude coumarone-indene resin oil is fractionated at atmospheric pressure in a column still. It is important that the first distillation be carried out at atmospheric pressure to provide still temperatures high enough to promote dissociation of a polymer such as dicyclopentadiene to its monomeric form. The distillation should be carried out at a rate as rapid as is consistent with good fractionation, but that rate should not exceed the rate of dissociation of the polymeric form of the undesirable constituents. I have found fractionation at atmospheric pressure up to a top column temperature of 150° C. is effective to remove the low-boiling constituents from a resin oil intended for production of coumarone type resins. With the average crude heavy solvent the distillate removed in this step amounts to about 5% to 10% of the crude resin oil, but where the content of cyclopentadiene or other low-boiling constituents is higher it may reach 20%. Polymerization of this distillate yields a low melting, extremely dark colored resin with accompanying process difficulties due to emulsions.

The resin oil thus partially refined is redistilled under vacuum in the column still, with still temperature maintained below 190° C., up to the appearance of solid naphthalene in the condenser, i. e. a top column temperature corresponding to 205° C. if the distillation were carried out at atmospheric pressure. The fractionation under vacuum is important since substantially all the undesirable constituents remaining in the oil at this point are in the form of compounds of higher boiling points than the desired resin oil fraction, which compounds, however, tend to dissociate at temperatures above about 190° C. Therefore, when the still temperature is kept below 190° C. by conducting the distillation at reduced pressure, the high-boiling undesirable constituents do not dissociate and the fraction of the resin oil useful for polymerization may be distilled, leaving the high-boiling undesirable constituents as residue.

Coumarone type resins may be prepared from the refined resin oil thus prepared by polymerizing the coumarone and other polymerizable constituents by treatment with catalysts, e. g. sulfuric acid, activated clay or metallic halide catalysts such as aluminum chloride or tin tetrachloride, as well known in the art.

The following example is illustrative of the process of my invention. All parts are by volume.

A charge of 500 parts of crude heavy solvent (an oil of coke oven origin) was fractionated at atmospheric pressure in a column still up to a top column temperature of 150° C. 35 parts (7%) of the oil were distilled over. The residual oil in the still was then distilled under a vacuum of about 27 inches of mercury up to the appearance of solid naphthalene in the condenser. In the vacuum distillation, the still temperature did not rise above 150° C.

The distillate from the vacuum fractionation was polymerized, using sulfuric acid as catalyst, the acid sludge was drawn off, and the polymerized oil neutralized with soda ash solution and washed. No emulsion difficulties were encountered in these operations and a very light colored resin was obtained.

Throughout the specification and claims, the term "resin oil" is used to refer to an oil containing a substantial proportion of polymerizable constituents such as coumarone, indene, styrene homologues, or similar substances, and which may contain styrene and other polymerizable constituents.

Since certain changes may be made in carrying out the above process without departing from the scope of the invention, it is intended that all matter contained in the above description shall be interpreted as illustrative and not in a limiting sense.

What is claimed is:

1. A process for removal of color-forming impurities from a crude resin oil in which the polymerizable constituents consist predominantly of material selected from the group consisting of coumarone, indene and homologues of styrene, said process comprising fractionally distilling the oil to separate low-boiling color-forming bodies as distillate while leaving the bulk of the oil including substantially all the above-named polymerizable constituents in the still, and thereafter subjecting this residual oil to low vapor pressure fractional distillation to separate as distillate a refined resin oil comprising substantially all the material that would distill over at temperatures up to about 205° C. at atmospheric pressure, and to separate as still residue high-boiling color-forming bodies which tend to decompose within the boiling range of the said polymerizable constituents at atmospheric pressure, said residual oil being maintained below about 190° C. during the second distillation.

2. In the treatment of a crude resin oil in which the polymerizable constituents consist predominantly of material selected from the group consisting of coumarone, indene and homologues of styrene, preparatory to production of a resin therefrom by polymerization, the steps which comprise fractionally distilling the resin crude at atmospheric pressure to separate low-boiling color-forming bodies as distillate while leaving the bulk of the oil including substantially all the above-named polymerizable constituents in the still, and thereafter fractionally distilling this residual oil at reduced pressure to separate as distillate a refined resin oil comprising substantially all the material that would distill over at temperatures up to about 205° C. at atmospheric pressure, and to separate as still residue high-boiling color-forming bodies which tend to decompose within the boiling range of the said polymerizable constituents at atmospheric pressure, said residual oil being maintained below about 190° C. during the second distillation.

3. In the treatment of a crude resin oil in which the polymerizable constituents consist predominantly of material selected from the group consisting of coumarone, indene and homologues of styrene, preparatory to production of a resin therefrom by polymerization, the steps which comprise fractionally distilling the oil at atmospheric pressure to separate constituents distilling over up to about 150° C., and thereafter subjecting the oil to low vapor pressure fractional distillation to recover as distillate a refined resin oil comprising substantially all the material that would distill over at temperatures up to about 205° C. at atmospheric pressure and to separate as still residue high-boiling color-forming bodies which tend to decompose within the boiling range of the said polymerizable constituents at atmospheric pressure, said oil being maintained below about 190° C. by carrying out the second distillation under reduced pressure.

4. In the treatment of a crude resin oil in which the polymerizable constituents consist predominantly of material selected from the group consisting of coumarone, indene and homologues of styrene, preparatory to production of a resin therefrom by polymerization, the steps which comprise fractionally distilling the crude at about atmospheric pressure to separate cyclopentadiene as distillate, and thereafter fractionally distilling the oil at reduced pressure to separate as distillate a refined resin oil comprising substantially all the material that would distill over at temperatures up to about 205° C. at atmospheric pressure, and to separate as still residue high-boiling addition products of cyclopentadiene, the oil temperature being maintained below about 190° C. during the second distillation.

5. In the treatment of a crude resin oil boiling in the range about 135° to 205° C. in which the polymerizable constituents consist predominantly of material selected from the group consisting of coumarone, indene and homologues of styrene, preparatory to production of a resin therefrom by polymerization, the steps which comprise fractionally distilling the oil at atmospheric pressure to separate about 5% to 20% thereof as distillate, and thereafter fractionally distilling the remainder of the oil at reduced pressure to separate as distillate a refined resin oil comprising substantially all the material that would distill over at temperatures up to about 205° C. at atmospheric pressure, and to separate as still residue high-boiling, color-forming bodies which tend to decompose within the boiling range of the said polymerizable constituents at atmospheric pressure, the oil in the still being maintained below about 190° C. during the second distillation.

6. A process for removal of color-forming impurities from a crude resin oil derived from a coke-oven distillate, in which resin oil the polymerizable constituents consist predominantly of material selected from the group consisting of coumarone, indene, and homologues of styrene, said process comprising fractionally distilling the oil to separate low-boiling color-forming bodies as distillate while leaving the bulk of the oil including substantially all the above-named polymerizable constituents in the still, and thereafter subjecting this residual oil to low vapor pressure fractional distillation to separate as distillate a refined resin oil comprising substantially all the material that would distill over at temperatures up to about 205° C. at atmospheric pressure, and to separate as still residue high-boiling color-forming bodies which tend to decompose within the boiling range of said polymerizable constituents at atmospheric pressure, said residual oil being maintained below about 190° C. during the second distillation.

7. A process for removal of color-forming impurities from a crude resin oil derived from drip oil, in which resin oil the polymerizable constituents consist predominantly of material selected from the group consisting of coumarone, indene, and homologues of styrene, said process comprising fractionally distilling the oil to separate low-boiling color-forming bodies as distillate while leaving the bulk of the oil including substantially all the above-named polymerizable constituents in the still, and thereafter subjecting this residual oil to low vapor pressure fractional distillation to separate as distillate a refined resin oil comprising substantially all the material that would distill over at temperatures up to about 205° C. at atmospheric pressure, and to separate as still residue high-boiling color-forming bodies which tend to decompose within the boiling range of the said polymerizable constituents at atmospheric pressure, said residual oil being maintained below about 190° C. during the second distillation.

8. A process for removal of color-forming impurities from a crude resin oil derived from cracked and reformed petroleum oil, in which resin oil the polymerizable constituents consist predominantly of material selected from the group consisting of coumarone, indene, and homologues of styrene, said process comprising fractionally distilling the oil to separate low-boiling color-forming bodies as distillate while leaving the bulk of the oil including substantially all the above-named polymerizable constituents in the still, and thereafter subjecting this residual oil to low vapor pressure fractional distillation to separate as distillate a refined resin oil comprising substantially all the material that would distill over at temperatures up to about 205° C. at atmospheric pressure, and to separate as still residue high-boiling color-forming bodies which tend to decompose within the boiling range of the said polymerizable constituents at atmospheric pressure, said residual oil being maintained below about 190° C. during the second distillation.

EDWIN L. CLINE.